United States Patent [19]
Utsunomiya et al.

[11] Patent Number: 6,101,558
[45] Date of Patent: Aug. 8, 2000

[54] HIGH SPEED FILE I/O CONTROL METHOD AND SYSTEM WITH USER SET FILE STRUCTURE TO EFFECT PARALLEL ACCESS PATTERN OVER A NETWORK

[75] Inventors: Naoki Utsunomiya, Kawasaki; Takashi Nishikado, Ebina; Koji Sonoda; Hiroyuki Kumazaki, both of Yokohama, all of Japan

[73] Assignee: Hitachi, Ltd., Tokyo, Japan

[21] Appl. No.: 09/104,168

[22] Filed: Jun. 25, 1998

[30] Foreign Application Priority Data

Jun. 26, 1997 [JP] Japan .................................. 9-169935

[51] Int. Cl.$^7$ ....................................................... G06F 7/00
[52] U.S. Cl. .................................. 710/6; 707/2; 707/10; 709/217; 711/112
[58] Field of Search .......................... 707/2, 10; 709/217; 710/6; 711/112

[56] References Cited

U.S. PATENT DOCUMENTS

| | | | |
|---|---|---|---|
| 4,901,232 | 2/1990 | Harrington et al. | 710/6 |
| 5,548,724 | 8/1996 | Akizawa et al. | 709/203 |
| 5,745,915 | 4/1998 | Cooper et al. | 711/114 |
| 6,003,045 | 12/1999 | Freitas et al. | 707/205 |

OTHER PUBLICATIONS

Corbett, P.F. and Feitelson, D.G., "The Vesta Parallel File System," ACM Transactions on Computer Systems, pp. 225–264, Aug. 1996.

*Primary Examiner*—Thomas C. Lee
*Assistant Examiner*—Albert Wang
*Attorney, Agent, or Firm*—Antonelli, Terry, Stout & Kraus, LLP

[57] ABSTRACT

A file input/output control system has first computers each having disks and connected to a network; and at least one second computer connected to the network for accessing the disks connected to the plurality of first computers, the second computer having: a retriever for retrieving first data access requests issued from a plurality of processes of an application and comparing the first data access requests with correspondence relation defining information to thereby confirm that the first data access requests are accesses to disks, the correspondence relation defining information being entered by a user in advance and indicating a correspondence relation between the disks and each of regions in a file stored in disks of the first computers; and a scheduler for creating second data access requests to the disks from first data access requests confirmed to be accesses to disks, in accordance with the correspondence relation defining information between the disks and each of the regions in a file stored in the disks of the first computers, and transmitting the second access requests to the network, wherein the first computers access the disks in accordance with the second data access requests received via the network. Each of the first computers has a rearranger for rearranging second data access requests for each of the disks in the order of block numbers in each of the disks. Each of the first computers has a merger for merging, upon detection of that the second data access requests to each of the disks contain data access requests to a continuous disk field, the disk access requests to one disk access request. Although two-dimensional array data distributively stored in the first computers is defined in a row direction, in response to an access command for referring to the two-dimensional array data in a column direction, the network driver reads data containing unnecessary data from the disks, transmits the data containing unnecessary data to each of the second computers, and each of the second computers filters the data containing unnecessary data to discard the unnecessary data and obtain necessary data for the second computer.

15 Claims, 11 Drawing Sheets

```
struct file {
        type_P A;
        type_Q B;
        type_R C;
        type_S D;
};

distribute file.A at {1, 2};
distribute file.B at {3, 4};
distribute file.C at {1, 3};

set path file.C to {P1, P2};
set path file.D to N1 with proto NFS;
```

| 60 | | 61 | 62 | 63 | 64 |
|---|---|---|---|---|---|
| | A | 0 | L1 | 1 | |
| | | OFT1 | L2 | 2 | |
| | B | OFT2 | L3 | 3 | |
| | | OFT3 | L4 | 4 | |
| | C | OFT4 | L5 | 1 | P1, P2 |
| | | OFT5 | L6 | 3 | |
| | D | OFT6 | L7 | N1 | NFS |

```
struct file {
        type_P A;
        type_Q B;
        type_R C;
        type_S D;
};

distribute file.A at {1, 2};
distribute file.B at {3, 4};
distribute file.C at {1, 3};

set cache file.A;
set readonly file.B;
set cache file.B;
set relation file.C to "K";
set relation file.C to "L";
set mirror file.D at {1, 2};
```

FIG. 16

```
fd = open ("P", ..);
sfd = open_sub (fd, "C", ...);
```

FIG. 19

HIGH SPEED FILE I/O CONTROL METHOD AND SYSTEM WITH USER SET FILE STRUCTURE TO EFFECT PARALLEL ACCESS PATTERN OVER A NETWORK

BACKGROUND OF THE INVENTION

1. Field of the Invention

The present invention relates to a file input/output (I/O) control method, and more particularly to a high speed file I/O control method of controlling to access one file from a plurality of related processors in parallel.

2. Description of the Related Art

A system, in which a file is divided into sub-files which are divisionally stored in a plurality of file devices and accessed in parallel, is known as taught in N. Nieuwejaar and David Kotz, "The Galley Parallel File System", the Conference Proceedings of the 1996 International Conference on Supercomputing, pp. 374 to 381 and in JP-A-8-292905.

SUMMARY OF THE INVENTION

It is an object of the present invention to provide a file I/O control method capable of setting a file structure of each file matching an access pattern desired by a user to thereby enhance a file parallel access effect.

It is another object of the present invention to make it possible to set various attributes to each region of a file.

It is a further object of the present invention to provide a file I/O control method capable of collectively scheduling file parallel accesses by collecting access requests from a plurality of processes for each physical device and issuing the collected access requests to each physical device.

It is still another object of the present invention to improve the performance of data transfer between a disk device and a network.

In accordance with the invention, there is provided a file input/output control system comprising:

a plurality of first computers each having a plurality of disks and connected to a network; and at least one second computer connected to the network for accessing the plurality of disks connected to the plurality of first computers, said second computer comprising:

a retriever for retrieving a plurality of first data access requests issued from a plurality of processes of an application and comparing the plurality of first data access requests with correspondence relation defining information to thereby confirm that the plurality of first data access requests are accesses to a plurality of disks, the correspondence relation defining information being entered by a user in advance and indicating a correspondence relation between the plurality of disks in said first computers and each of a plurality of regions in a file accessed by said second computer; and a scheduler for creating a plurality of second data access requests to the plurality of disks from a plurality of first data access requests coming from a plurality of second computers confirmed to be accesses to a plurality of disks, in accordance with the correspondence relation defining information between the plurality of disks and each of the plurality of regions in a file stored in the disks of said first computers, and transmitting the plurality of second access requests to the network, wherein the plurality of second computers access the disks in accordance with the plurality of second data access requests received via the network.

Each of the first computers may include a rearranger for rearranging a plurality of second data access requests for each of the plurality of disks in the order of block numbers in each of the plurality of disks.

Each of the first computers may include a merger for merging, upon detection of that the plurality of second data access requests to each of the plurality of disks contain a plurality of data access requests to a continuous disc field, the plurality of disk access requests to one disk access request.

The merger includes a disk driver for controlling the plurality of disks and a network driver for holding data obtained by said disk driver by accessing the plurality of disks and transmitting the data to said at least one second computer via the network.

The network driver may include a memory for storing the data obtained by said disk driver by accessing the plurality of disks for each of said at least one second computer and transferring the data separately stored in each of said at least one second computer.

The first computers are connected via a second networks to said at least one second computer, said network drivers of the plurality of first computers transfer the separately stored data to said at least one second computer via the network and said second networks.

Although two-dimensional array data distributively stored in a file, a plurality of whose regions are stored in the plurality of first computers is defined in a row direction, in response to an access command for referring to the two-dimensional array data in a column direction, said network driver reads data containing unnecessary data from the plurality of disks, transmits the data containing unnecessary data to each of the plurality of second computers, and each of the plurality of second computers filters the data containing unnecessary data to discard the unnecessary data and obtain necessary data for the second computers.

According to one aspect of the present invention, a file input/output control system is provided which comprises: a plurality of first computers each having a plurality of disks and connected to a network; and at least one second computer connected to the network for accessing the plurality of disks connected to the plurality of first computers, the second computer comprising: a retriever for retrieving a plurality of first data access requests issued from a plurality of processes of an application and comparing the plurality of first data access requests with correspondence relation defining information to thereby confirm that the plurality of first data access requests are accesses to a plurality of disks, the correspondence relation defining information being entered by a user in advance and indicating a correspondence relation between the plurality of disks and each of a plurality of files stored in a disk of the second computer; and a scheduler for creating a plurality of second data access requests to the plurality of disks from a plurality of first data access requests confirmed to be accesses to a plurality of disks, in accordance with the correspondence relation defining information between the plurality of disks and each of the plurality of files stored in the disk of the second computer, and transmitting the plurality of second access requests to the network, wherein the plurality of first computers access the plurality of disks in accordance with the plurality of second data access requests received via the network.

Each of the plurality of first computers may comprise a rearranger for rearranging a plurality of second data access requests for each of the plurality of disks in the order of block numbers in each of the plurality of disks.

Each of the plurality of first computers may comprise a merger for merging, upon detection of that the plurality of second data access requests to each of the plurality of disks contain a plurality of data access requests to a continuous disk field, the plurality of disk access requests to one disk access request.

The merger may comprise a disk driver for controlling the plurality of disks and a network driver for holding data obtained by the disk driver by accessing the plurality of disks and transmitting the data to the at least one second computer via the network.

The network driver may comprise a memory for storing the data obtained by the disk driver by accessing the plurality of disks for each of the at least one second computer and transferring the data separately stored in each of the at least one second computer.

The plurality of first computers may be connected via a second network to the at least one second computer, the network drivers of the plurality of first computers transfer the separately stored data to the at least one second computer via the network and the second network.

Although two-dimensional array data distributively stored in the plurality of first computers is defined in a row direction, in response to an access command for referring to the two-dimensional array data in a column direction, the network driver may read data also containing unnecessary data from the plurality of disks, transmits the data also containing unnecessary data to each of the plurality of first computers, and each of the plurality of computers filters the data also containing unnecessary data to discard the unnecessary data and obtain necessary data for the first computer.

According to the present invention, a table is created for setting a file structure definition designated in response to a file structure setting request issued from an application program which requests to distributively allocate a plurality of physical devices to a plurality of divided regions of a file. I/O requests are collected for each physical device, by referring to the file structure table set in response to the I/O requests for requesting parallel accesses to a plurality of regions of the file. A high speed file I/O control method can be provided which controls parallel data transfers between physical devices and a plurality of processes executing the application program. Each region of the file can be set with various attributes such as a data transfer path, a data striping and a data caching.

Further, according to the present invention, a high speed file I/O control method is provided in which of a plurality of processes executing the application program, one process collects I/O requests for requesting parallel accesses to a plurality of regions of the file and issuing the I/O requests to each physical device.

Furthermore, according to the present invention, a high speed file I/O control method is provided in which for the data transfer via a network between a process executing the application program and a physical device, after a device driver of the physical device is set up by a file management program, data is directly transferred between the network and physical device via the device driver of the physical device and a network driver.

DETAILED DESCRIPTION OF THE PREFERRED EMBODIMENTS

An embodiment of the present invention will be described with reference to the accompanying drawings.

Figure 1:
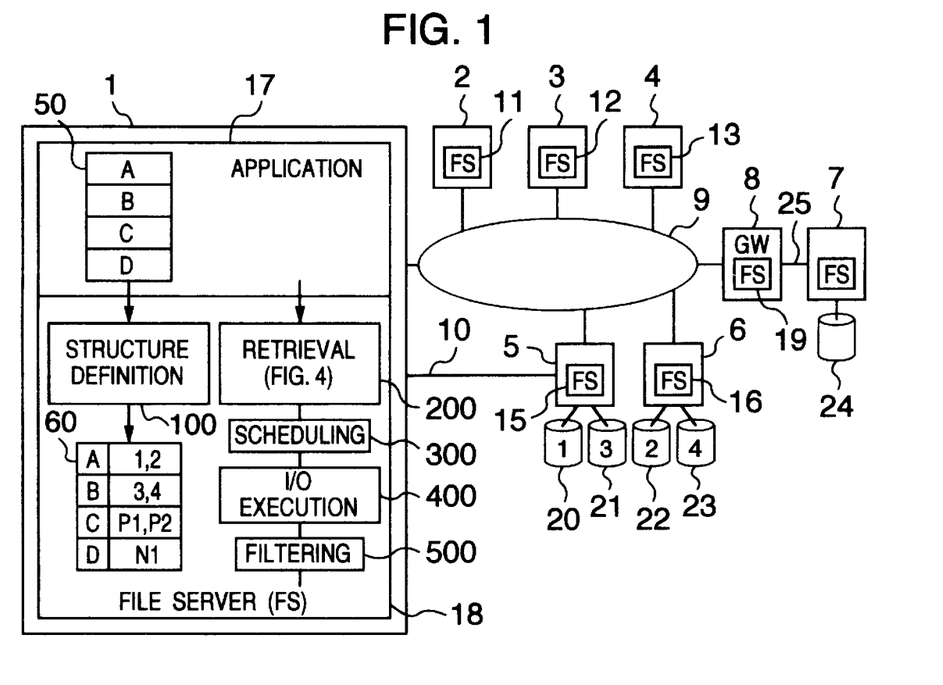
FIG. 1 is a diagram showing the structure of a high speed file system.

FIG. 1 shows the structure of a high speed file system according to the invention. Computers 1 to 6, and 8 are interconnected via a network 9. The computers have file servers (FS) 11 to 13, 15, 16, and 19. The computers 1 to 4 and 8 connect the network 9 and a network 25 as their input/output (I/O) devices. The computers 1 and 5 connect a network 10 in addition to the network 9. The computers 5 and 6 connect disk devices 20 to 23 in addition to the networks 9 and 10, as their I/O devices. The disk devices 20 to 23 are discriminated by their device numbers "1", "3", "2" and "4", respectively. The computer 8 functions as a gateway to the network 25. Another computer 7 is connected to the network 25, and connects a disk device 24. In order to access a file in the disk devices 20 to 24, a user application program 17 installed on the computer 1 instructs a file server 18 of the computer 1 to define a file structure (to be later described) and issue a file I/O request. If the application programs of the computers 2 to 4 are executed in parallel with the application program of the computer 1, the file servers 11 to 13 of the computers 2 to 4 operate in a similar manner to the file server 18 of the computer 1. The file servers 15, 16, and 19 on the computers 5 and 6 connecting the disk devices 20 to 23 and on the computer 8 connecting the external network 25, receive requests from the file servers of the other computers 1 to 4 and perform actual disk I/O processes to transmit the results back to the requesting computers 1 to 4. In the following description, although the application program 17 on the computer 1 will be detailed, the operations of the application programs on the other computers 2 to 4 running in parallel with the computer 1 are similar to that of the application program 17. The sequence of the file I/O process will be described next.

Figure 2:
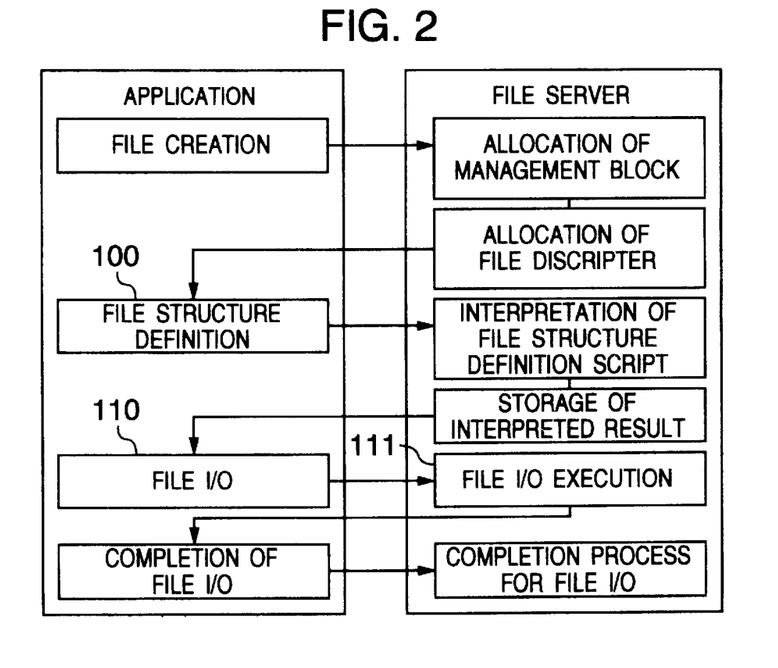
FIG. 2 is a diagram showing a file I/O sequence.

As shown in FIG. 2, the file I/O process as observed from a user is generally constituted of steps including a file creation step, a file structure definition step (to be described later), a step of issuing a file I/O system call, a step of completing the file I/O process. The outline of the process at each step to be executed by the file server will be described hereinunder.

In creating a file requested by the application program, the file server allocates on main storage a management block of information for the requested file and a file discripter which is an internal file ID corresponding to the file name. At the file structure definition step, the file structure definition script supplied from the user is interpreted and the results are stored in a table 60. The contents in the table 60 are transmitted to the computer 5 or 6 to be stored in its memory or disk device. When a file I/O system call is issued, the file is read/written in accordance with the file structure definition. At the file I/O completing step, unnecessary management data on the main storage is released and other necessary processes are performed. The file server is a file management program which executes the above-described steps.

Figure 3:
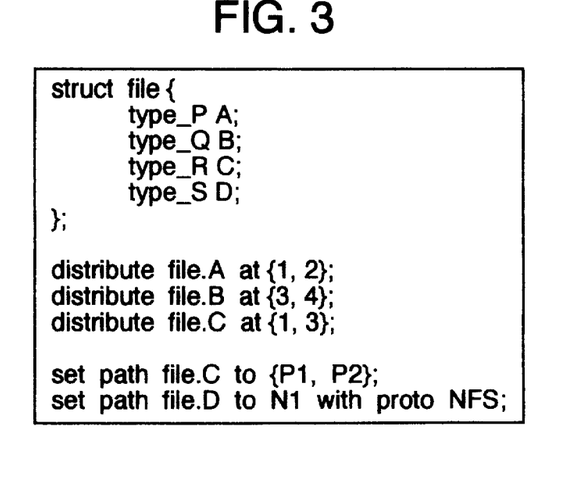
FIG. 3 is a diagram showing an example of a file structure definition script.

Next, the file structure definition step 100 will be detailed. At this step, a user defines a file structure in the application program, and assigns each region of the file with the defined structure with attributes (a disk device to which a file region is allocated, an access path to the disk device, a protocol to be used for accessing). With this step, a file access can be requested to the file server, while maintaining improved performance and reliability. Only one structure definition is set by the application program even if a plurality of processes are necessary to run the application program. FIG. 3 shows an example of a file structure definition script. The words struct, distribute, set path are key words, and a delimiter between statements is a semicolon. The first statement defines a logical structure of a file which indicates that the defined file is constituted of four regions A, B, C and D. "type_P" and the like under the "struct" statement indicating that the file is constituted of the four regions A to D are a type designator for designating a data type and a region size. The type designator is, for example, an array of fixed length bytes and a fixed length character string. The "distribute" statement designates a physical device as an attribute. In the example shown in FIG. 3, each of the regions A, B and C is allocated with a plurality of I/O devices. For example, the first "distribute" statement indicates that the region A is equally divided and distributed to the disk devices 20 and 21 (refer to FIG. 1, the disk device numbers on the file structure table 60 are "1" and "2"). The "set path" statement designates an access path from the region to its disk device as an attribute. In the example shown in FIG. 3, the disk devices 20 and 21 having the region C are connected to the computer 5. Between this computer 5 and the computer 1 running on the application program, there are two paths, as shown in FIG. 1, a path P1 using the network 9 and a path P2 using the network 10. The first "set path" statement means that the paths P1 and P2 are used for the computer 1 to access the region C. It becomes therefore possible that data transfer can be performed with a large communication bandwidth using the two paths, and that the region C can be accessed with high performance. If one application program has a plurality of processes to be executed by a plurality of computers, use of the two paths is applied only to the application program of the computer 1.

Figure 5:
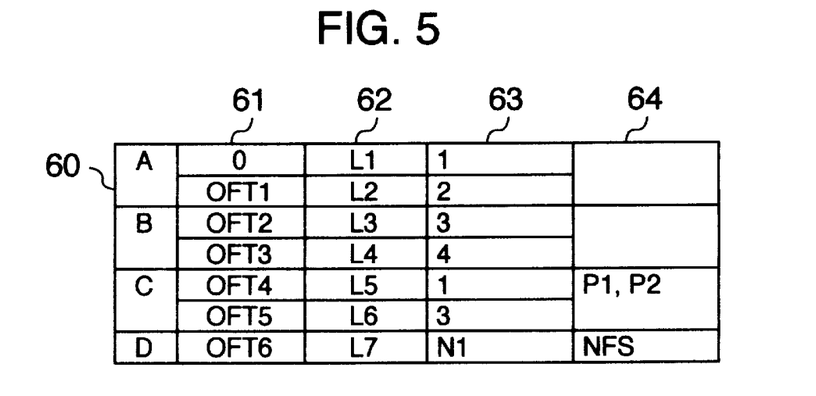
FIG. 5 is a diagram showing the data structure of a file structure table.

The second "set path" statement designates the access path from the region D to its corresponding device and indicates that a file server uses an NFS protocol to access the region D (refer to FIG. 5). Therefore, an access to the region D is performed via the gateway computer 8. Since the NFS protocol is designated, the application programs running on the computers 1 to 4 transparently see the disk device 24 as if it is connected to the gateway computer 8.

Figure 4:
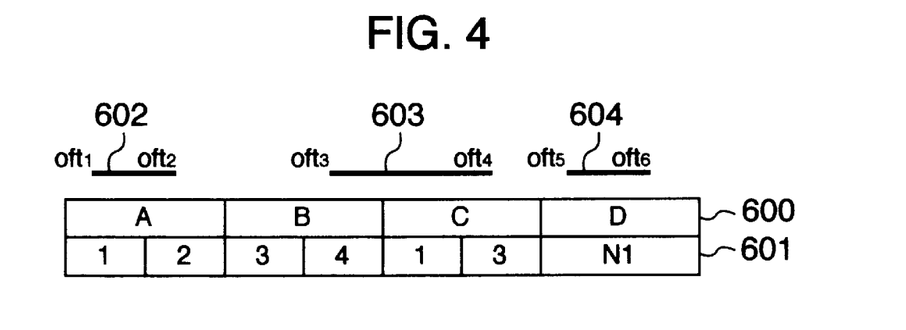
FIG. 4 is a diagram showing a file structure and file access regions.

Upon reception of the file structure definition script, the file server interprets it to form the file structure table 60. FIG. 4 shows the file structure defined at the file structure defining step. In this structure, portions 602, 603 and 604 will be later described. In the structure, an upper row 600 indicates the names of the regions defined by the script, and a lower row 601 indicates that each region is distributed to what disk device. For example, the front half of the region A is assigned to the disk device 20, whereas the back half thereof is assigned to the disk device 22. Therefore, an access to the front half of the region A is performed by always accessing the disk device 20. FIG. 5 shows the file structure table 60. The table is constituted of, sequentially from the left column, the name of each region, a start offset 61 of each portion of the region, a length (byte number) 62 of each portion, a device number 63 of an allocated disk device, and other attributes 64. The start offset of the first portion of region A is expressed by a relative byte address (RBA) as referenced to the start address "0" of this file. For the region A, it is designated that the region A is distributively stored in the disk devices 20 and 22. However, since the amount to be distributed is not explicitly described, the file server equally divides the region A and stores the divided subregions into both the disk devices. Therefore, the offset and length of each of the two sub-regions of the region A can be determined relative to the whole of the file. For the region A, data of L1 bytes from the start of the file is stored in the disk device 20, and data of L2 bytes from OFT1 (=L1) is stored in the disk device 22. For the region C, since two access paths P1 and P2 are designated, these access paths are written in the other attribute column. For the region D, since this region is accessed via the other network N1 25 by using the NFS protocol, this protocol name is written in the other attribute column. The file server 18 stores information of the file structure table 60 formed at the file structure definition step, in some disk devices such as the disk devices 20 and 21. Referring to the disk device numbers 63, the disk device 20 is allocated to the region A and thereafter to the region C, so that data of the length L1 and data of the length L5 form a continuous storage field in the physical device 20.

With the file structure definition function of this invention, a user can set the file structure matching an optimum access pattern which allows the file parallel access effect to be enhanced.

Figure 18:
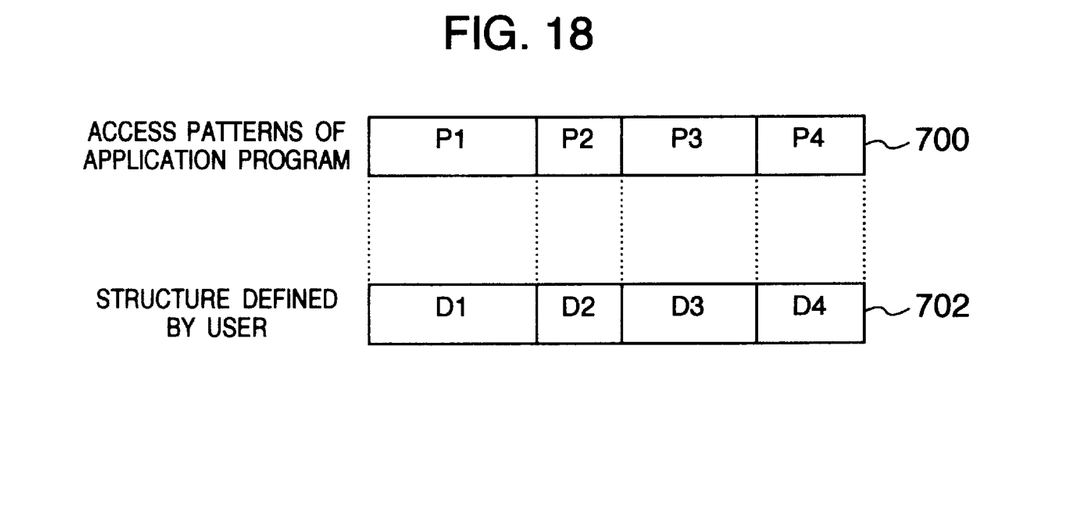
FIG. 18 is a diagram showing a correspondence between access patterns of a user application program and allocation of regions on physical devices.

For example, as shown in FIG. 18, if a user defines a file structure 702 for access patterns 700 of an application program, each application can access the disk devices D1 to D4 independently from each other so that the file parallel access effect can be retained.

Next, the details of an actual I/O operation using the above example will be given. As shown in FIG. 1, the file I/O process is constituted of a retrieval step 200, a scheduling step 300, an I/O execution step 400, and a filtering step 500. It is assumed as shown in FIG. 4 that the application program 17 accesses portions 602, 603 and 604 of the file. The portion 602 is an access area only within the region A and has a range from the offset oft1 to oft2. The portion 603 is an access area ranging over both the regions B and C, and the portion 604 is an access area only within the region D.

Figure 6:
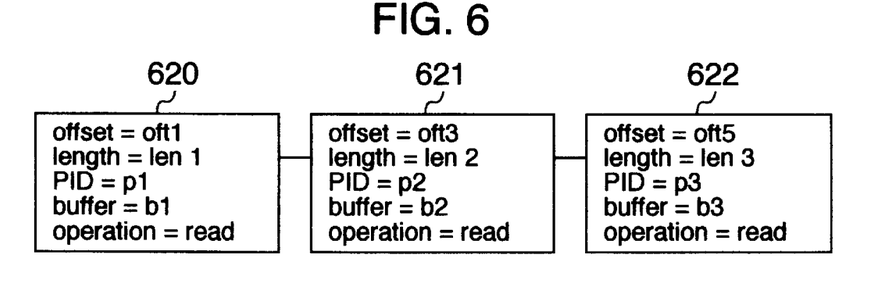
FIG. 6 is a diagram showing an example of a list of file access requests.

When the application program issues an access request, it passes an access request list such as shown in FIG. 6 to the file server 18. Elements 620, 621 and 622 of the access request list correspond to access requests to the portions 602, 603 and 604. Each element stores an offset and length of an area to be accessed, a process ID of an application program issuing access request, a buffer area for data reception/transmission, and an access type. In this example, the three areas are accessed in parallel by processes of an application program. The element 620 corresponds to a request of reading data of an len 1-byte length from the offset oft1 into a buffer b1 (not shown) in the computer 1. File server 18 provides with an application program interface (AP2) which can enable an application program 17 to issue a plurality of access requests simultaneously by specifying a list of access requests.

Figure 7:
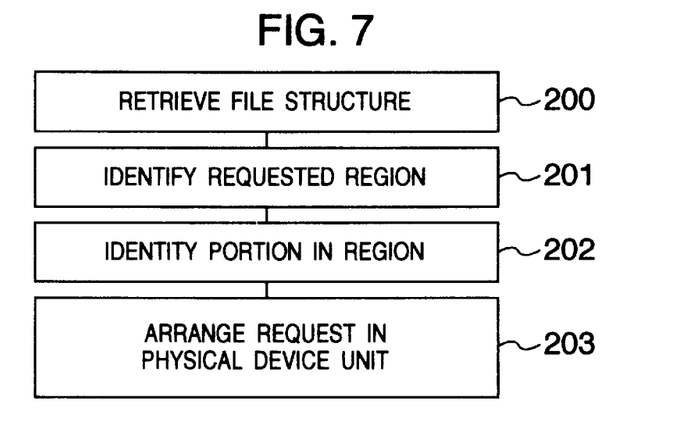
FIG. 7 is a diagram showing a flow of a retrieval step.
Figure 8:
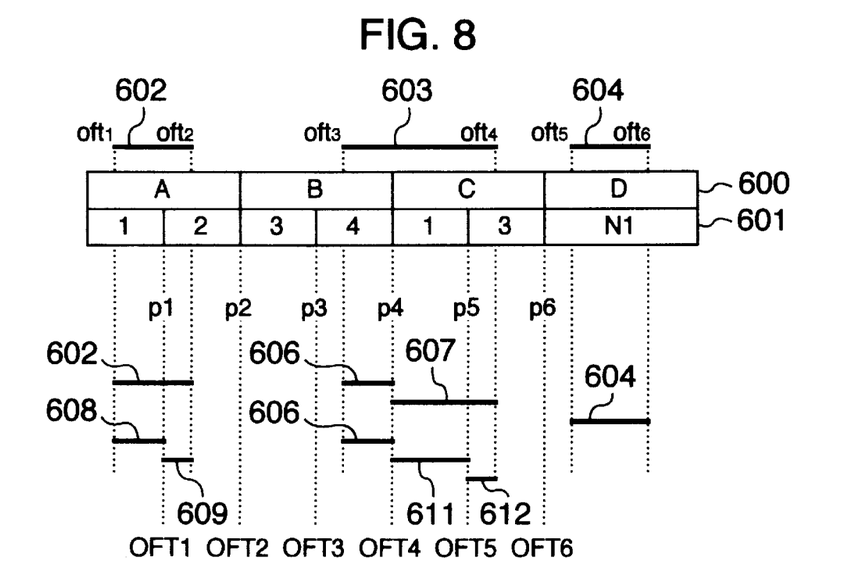
FIG. 8 is a diagram illustrating the division of an I/O request.

As the application program 17 issues an I/O request, the file server 18 receives it and performs the retrieval step (200 in FIG. 7). At this retrieval step 200, the offset and length of each element are derived from the request list, and the file structure table 60 is searched to identify which region the request corresponds to. These operations correspond to an identification of the region (201). For the request to the portion 602, the table 60 (FIG. 5) is searched to confirm that the request start offset oft1 is between 0 to p2 (=offset 0+L1+L2) and the request end offset oft2 (=oft1+len 1) is between 0 to p2, and that the request to the portion 602 is a request of only the region A (refer to FIG. 8). For the request to the portion 603, it is confirmed that the offset oft3 is between p2 and p4 and that the request end offset oft4 (=of3+len 2) is between p4 and p6, to thereby confirm that the request is a request to both the regions B and C. Such a request to two or more regions is divided into requests to respective regions, such as requests to portions 606 and 607. For the request to the portion 604, it is confirmed that the request is a request of only the region D, similar to the request to the portion 602.

Next, a step (202) of identifying a portion within each region is performed. With this step, the request to each region generated by the above steps is further divided into requests to respective disk devices (refer to FIG. 8). For the request to the portion 602, the file structure table 60 (FIG. 5) is checked to confirm that the request ranges over both the disk devices 20 and 22. The request to the portion 602 is divided into a request 608 to the disk device 20 and a request 609 to the disk device 22. For the request to the portion 606, since this access request is a request only to the disk device 23, the request is not changed at this step. For the request to the portion 607, the file structure table 60 is checked to confirm that the request ranges over both the disk devices 20 and 21, and the request is divided into a request 611 to the disk device 20 and a request 612 to the disk device 21. For the request to the portion 604, since the requested physical device is the same throughout the request range, the request is not changed at this step. In the above manner, a request is arranged in the unit of physical device (203).

Figure 9:
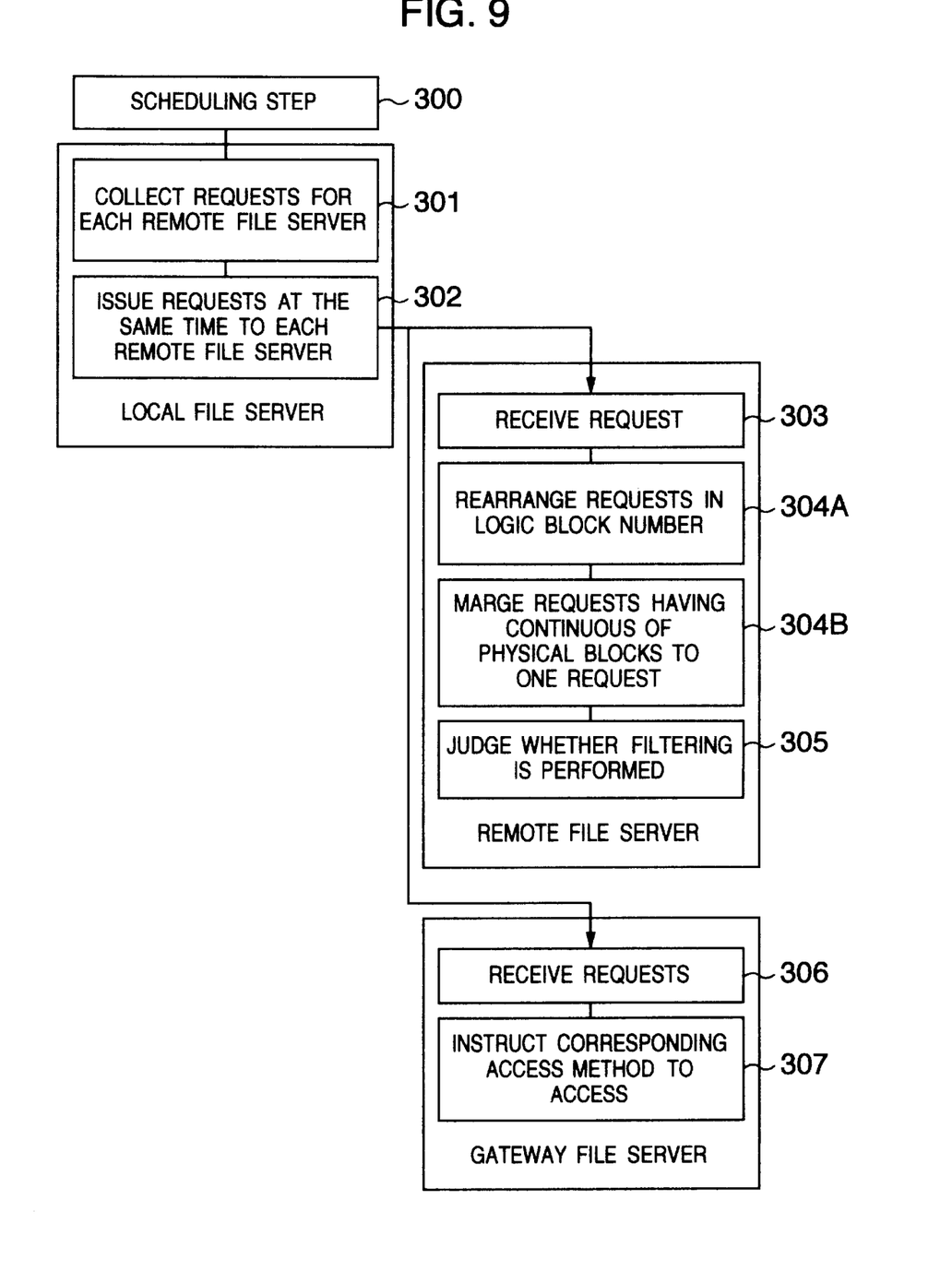
FIG. 9 is a diagram showing a flow of a scheduling step.

Next, the file server 18 executes the scheduling step 300 shown in FIG. 9. This scheduling step has two parts, one part being executed by the file server 18 on the computer 1 where the application program 17 issued the file I/O request, and the other part being executed by the file server on the computer which received the access request to the disk device connected to the computer. The former file server 18 is called a local file server, and the latter file server is called a remote file server, although the function of each file server is the same. In the scheduling step a local file server receives the requests 608, 609, 606, 611, 612 and 604 (refer to FIG. 8) divided in the retrieval step. First at Step 301, received requests for each destination file server are collected. Since the computer 5 running the file server 15 is connected to the disk devices 20 and 21, the requests 608, 611 and 612 whose target devices are disk devices 20 and 21 are collected. Since the computer 6 running the file server 16 is connected to the disk devices 22 and 23, the requests 609 and 606 are collected. Since the request 604 is required to access the other network via the gateway, this request is assigned as a request to the file server 19 of the gateway computer 8. Next at Step 302, the collected requests are issued at the same time to each requested file server (remote file server). Each request contains a file name, a disk device number, an access type, the start and end offsets of an access area, and network identifier if there are two or more access paths. The succeeding Steps are executed by each remote server. However, the request to the region D is processed slightly different from the operation by the remote server to be described hereinunder.

The remote file server classifies the requests received at Step 303 into a group of requests for each disk device, and rearranges the grouped requests in the order of the logical block number. The logical block number is a relative logical block number whose file start is logical block number "0", and is converted from the offset value. A physical block number is a physical address of a disk device, and is converted from the logical block number. A length of a logical block is equal to a length of a physical block, and the order of logical block numbers is the same as the order of physical block numbers. The file server 15 classifies the received requests into a group of requests 608 and 611 for the disk device 20 and a group of request 612 for the disk device 21. The file server 16 classifies the received requests into a group of request 609 for the disk device 22 and a group of request 606 for the disk device 23. The file server issues an access request to each disk device driver by using a disk logical block number. Prior to issuing the access request to each disk device driver, the file server rearranges the logical blocks of requested data in the order of logical block numbers. The physical blocks corresponding to the logical blocks are initialized when the disk device is formatted, so that a motion of the head results only in one direction when accessing a file in ascending order of logical block numbers. Specifically, the logical blocks are arranged so that a seek motion of the head results only in one direction throughout a disk access in the order of logical block number, assuming that the sequence of logical block number is LB(1), LB(2), . . . , LB(n) where each block number satisfies the following in equation; $LB(1) \leq LB(2) \leq \ldots \leq LB(n)$. With this arrangement, an access in the order of logical block numbers confirms one-direction head seek, preventing a performance degradation by head seek. At Step 304B, if a plurality of access requests is continuous in terms of physical block number, these requests are merged to one request. For example, the request 608 shown in FIG. 8 to the portion having a length L1 from the offset OFT1 of the region A shown in FIG. 5 and the request 611 shown in FIG. 8 to the portion having a length L5 from the offset OFT4 of the region C shown in FIG. 5, can be merged to one request.

At Step 305 it is judged whether filtering is performed. Whether the filtering is performed depends upon whether the requested region of the file has an unnecessary area or gap. If a gap is not contained, the filtering is not performed. Since the portions 602 and 603 each are a continuous area for each access request, a gap is contained in none of them. It is therefore judged that the filtering is not necessary. An example of filtering will be later described.

As shown in a lowest box in FIG. 9, for the portion 604 in the region D, the file server 19 received the request at Step 306 instructs an NFS protocol execution program as an access method to access the data, because the access request is directed to the disk device 24 via the NFS protocol (Step 307). Next, the process may enter the I/O execution step.

Figure 10:
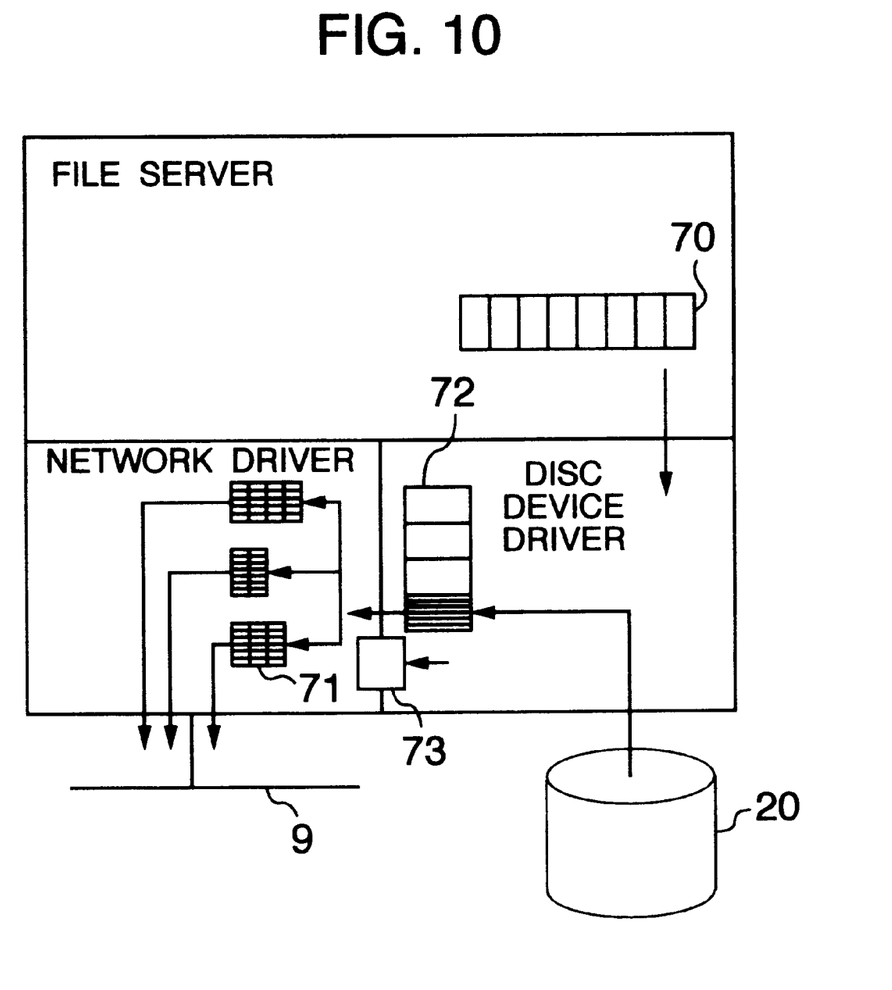
FIG. 10 is a diagram illustrating the operation of a file read process.

FIG. 10 illustrates a read operation to be executed by the file server 15 of the computer 5. The file server 15 sets up the device driver of the disk device and sends the access requests 70 arranged in the order of logical block numbers to the disk device driver. The disk device driver manages free buffers and reads data of the requested block from the disk device 20 to one of free buffers. The disk device driver and network device driver are connected together, and the data read in the buffer is not sent to the file server but directly supplied to the network device driver together with control information. Data transfer from the disk device driver to the network device driver is performed in the unit of disk block. This data transfer is performed in a pipe line manner. As compared to a conventional method in which control is passed from the disk device driver to the file server, an overhead can be reduced and high performance data transfer is possible. A common control information storage area 73 is provided for the network driver and disk device driver. The control information includes an identifier and a receive address of the file server which requested to read data. With reference to the control information, the network driver registers the read data in a queue 71 whose entry corresponds to each file server. In this example, since the requesting server is only one, the read data is registered in the queue of the computer 1. If there are a plurality of requesting servers, the read data is registered in a corresponding queue. Each time the data read request is issued, the disk device driver writes an anticipated interrupt time in the area 73. With reference to the anticipated interrupt time, the network driver determines a timing so that the network processing interrupt does not overlap the data read completion interrupt of the disk device having a slower access speed, and at this determined timing, transfers the read data to the requesting file server via the networks 9 and 10. The disk data transfer completion interrupt occurs at the end of the disk data transfer of one request. An interrupt by the network occurs at the end of the transmission of one or a plurality of packets.

The computer 5 is connected also to the disk device 21. The data read request to the disk device 21 is executed, in a similar manner as above, in parallel with the data read request to the disk device 20. Since there are two access paths to the region C, the network driver uses both the networks 9 and 10 to realize high speed data transfer. Although the access requests 608 and 611 to the portions 602 and 603 includes access to the same disk device 20, they are merged to one access request and the portions 602 and 603 are continuously accessed on the disk device. Therefore, an access contention of the disk device which lowers the file parallel access effect, will not occur.

Figure 11:
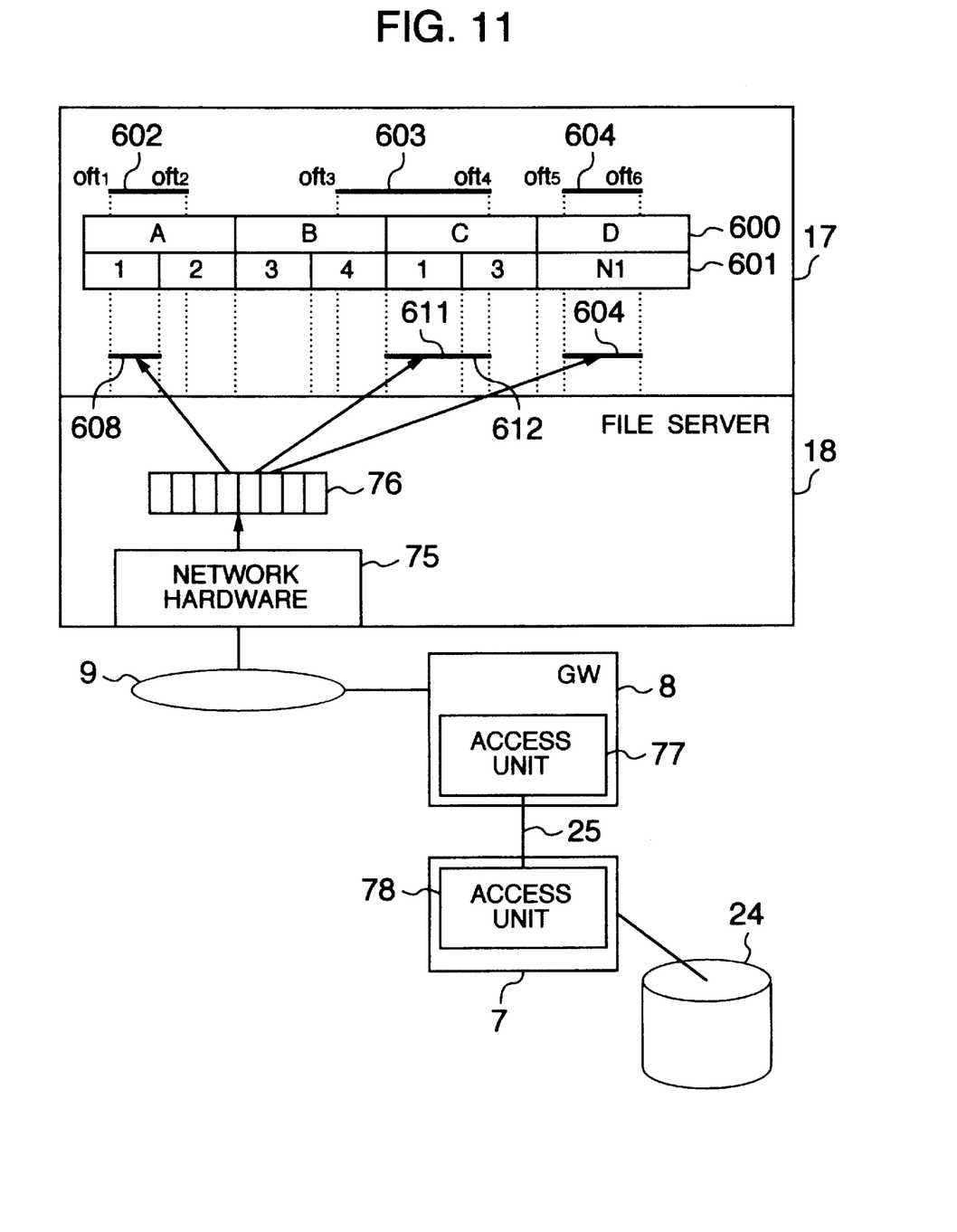
FIG. 11 is a diagram showing a flow of data when a file is read.

FIG. 11 shows a flow of read data in the requesting file server 18. Read data in the requested computer where remote file server resides is transferred to the computer 1 and received by a network hardware 75 in the computer 1. The network hardware 75 has a function of translating an address by referring to a conversion table 76. The conversion table 76 stores therein a correspondence between a virtual address in a virtual space and a physical address of a real main memory, the correspondence being preset by the file server. With reference to this table 76, the network hardware transfers the received data to the main memory at the area corresponding to a buffer area in the virtual space of the requested application program 17, without copying the received data between file server 18 and application program 17. The data read from the computer 5 is stored in the buffers corresponding to the requests 608, 611 and 612 to the disk devices 20 and 21. These buffers are specified by application program 17.

Data in the region D is transferred, from the disk device 24 connected to the computer 7 on the other network 25 via an access unit 78 in the computer 7 and an access unit 77 of the gate way 9, to the file server 18 of the computer 1 via the network 9. As the access unit for the region D, NFS is designated in the file structure definition. Therefore, data transfer between the gateway 8 and computer 7 is processed by the NFS protocol. The processing to be executed by the file server 18 are the same as those for the other regions A, B and C. Data read Steps of the remote file servers 15, 16 and 19 can be executed together in parallel.

Figure 12:
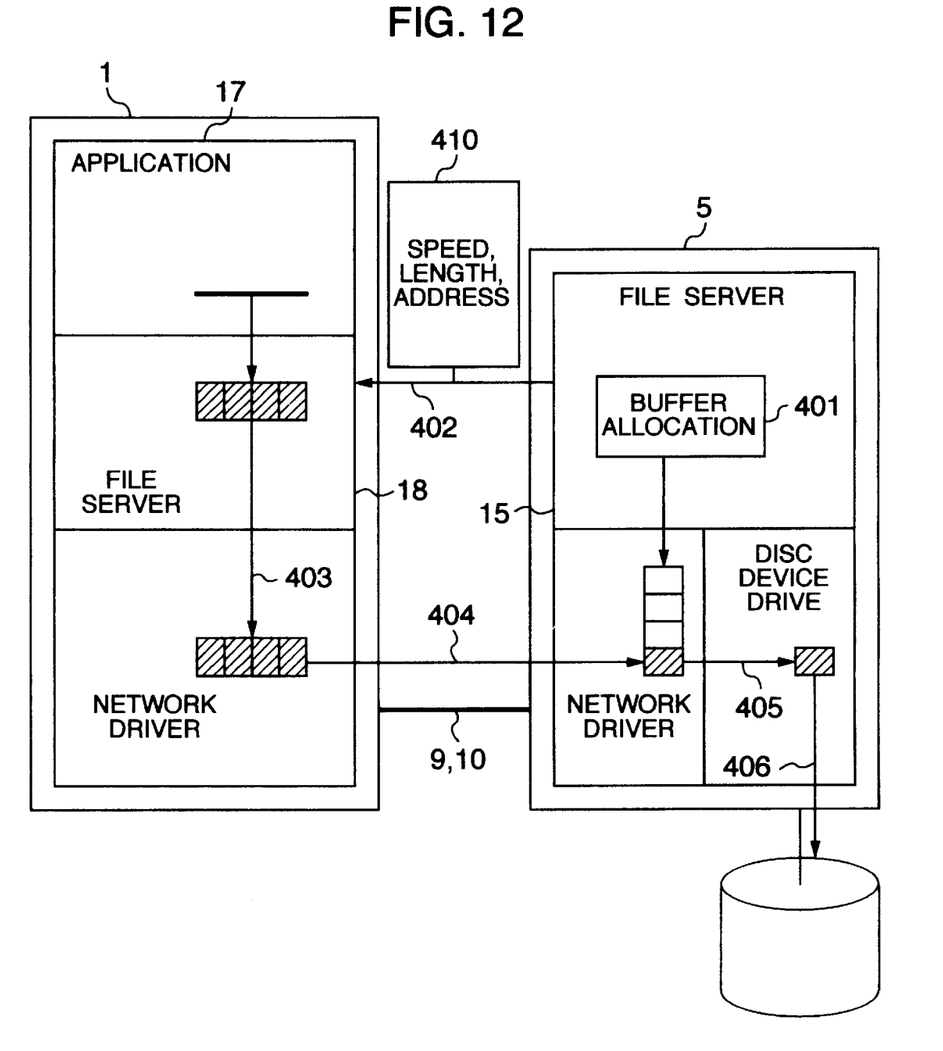
FIG. 12 is a diagram showing a flow of data when a file is written.

Next, data write will be described. FIG. 12 shows a flow of data at data write Step. The file server 18 transmits a data write request to, for example, the file server 15. The data write request contains the file name, disk device number, access type, and start and end offsets of the access area. In response to this data write request, the file server 15 allocates a buffer area at Step 401. It is generally impossible to allocate buffer areas for all the write data because of limited resources. Therefore, a buffer area for storing a portion of whole write data is allocated. Next at Step 402, a write data transfer request 410 is sent to the file server 18 of the data write requesting computer 1. The write data transfer request contains a transfer destination address of the file server 15, a buffer length and a transfer speed. The transfer speed is an effective transfer speed of a packet. A packet transfer time interval for preventing an overflow of the buffer can be calculated from the network transmission time and the specified transfer speed. The transfer speed specified by the file server 15 is approximately equal to an effective transfer speed of the disk device when the write data transfer request is issued. Upon reception of the write data transfer request, at Step 403 the filer server 18 sends the write data in the buffer to a network driver and the write data is transmitted to the computer 5. In this case, the file server 18 issues the write data transfer request to the network driver by block in the write data transfer request. The network driver transfers the requested write data in the form of packet (Step 404). This write data is directly transferred to the buffer of the file server 15. The network driver of the file server 15 directly passes the received write data to the disk device driver without using the file server 15 (Step 405). The disk device driver sequentially writes the received data in the disk device (Step 406).

As described earlier, the remote file server cannot prepare a write buffer capable of storing all the write data. Therefore, the write data transfer request is issued as many times as necessary (the number of blocks divided by the number of blocks capable of being prepared at one request). When the write data is transmitted at Step 404 from the network driver in computer 1, the network driver in computer 5 can control the time interval of transmitting packets in accordance with the transfer speed designated by each write data transfer request. Therefore, a data can be prevented from being lost by an overflow at the file server 15.

The write data for the region D is transferred to the gateway 8 and passed to the file server 19. The file server 19 transfers the write data to the computer 7 connected to the disk device 24 to which the write data is written, by using the NFS protocol as the access method.

Figure 13A:
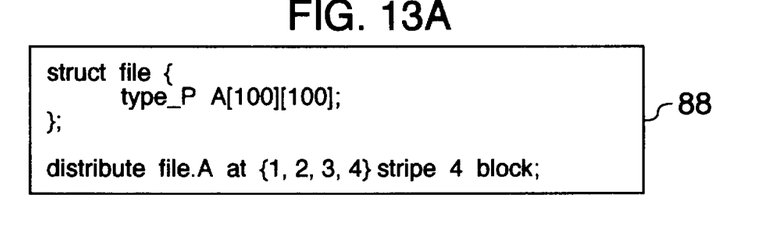
FIGS. 13A and 13B are diagrams showing an example of a file structure definition script for striping.
Figure 13B:
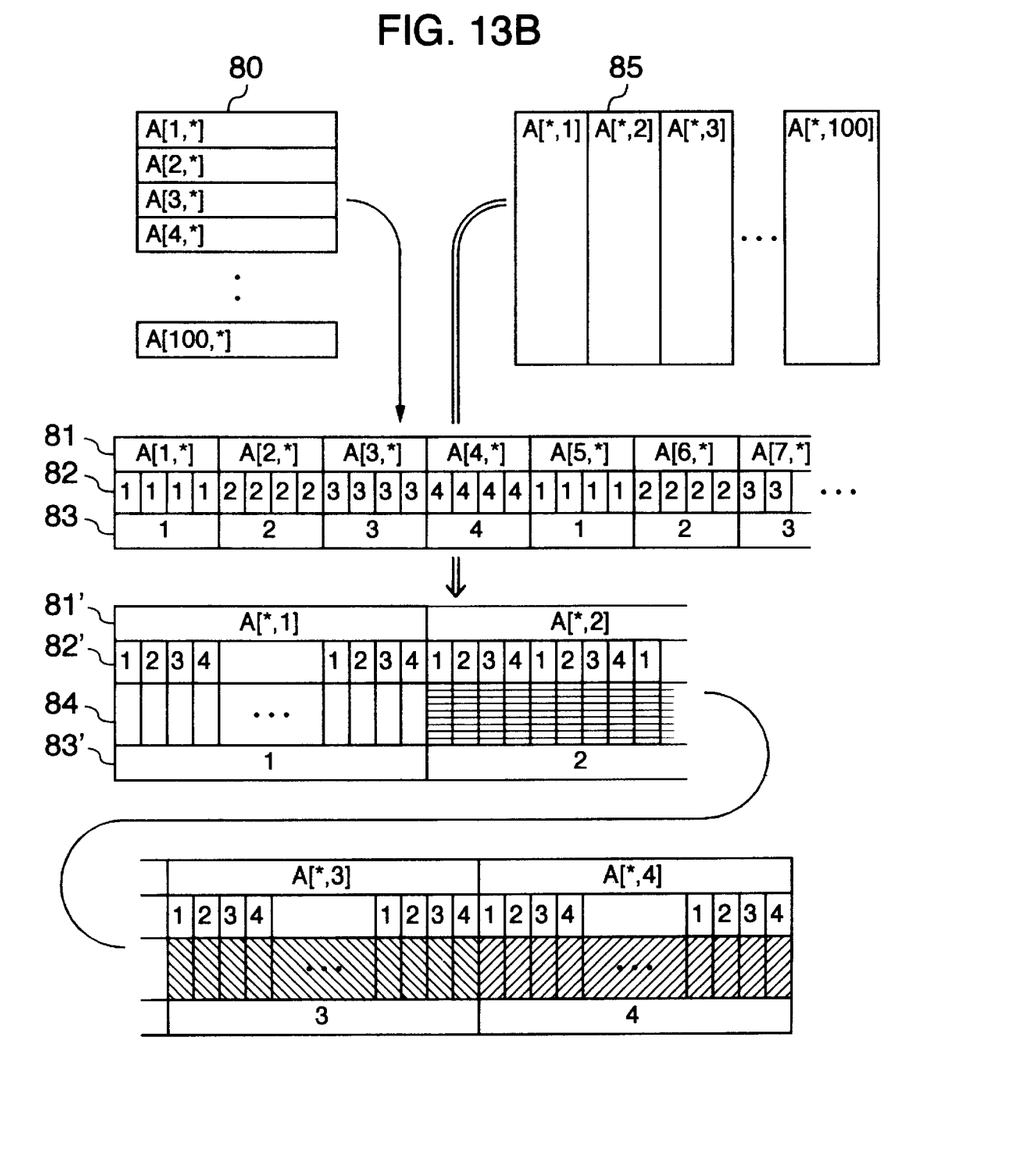
Figure 19:
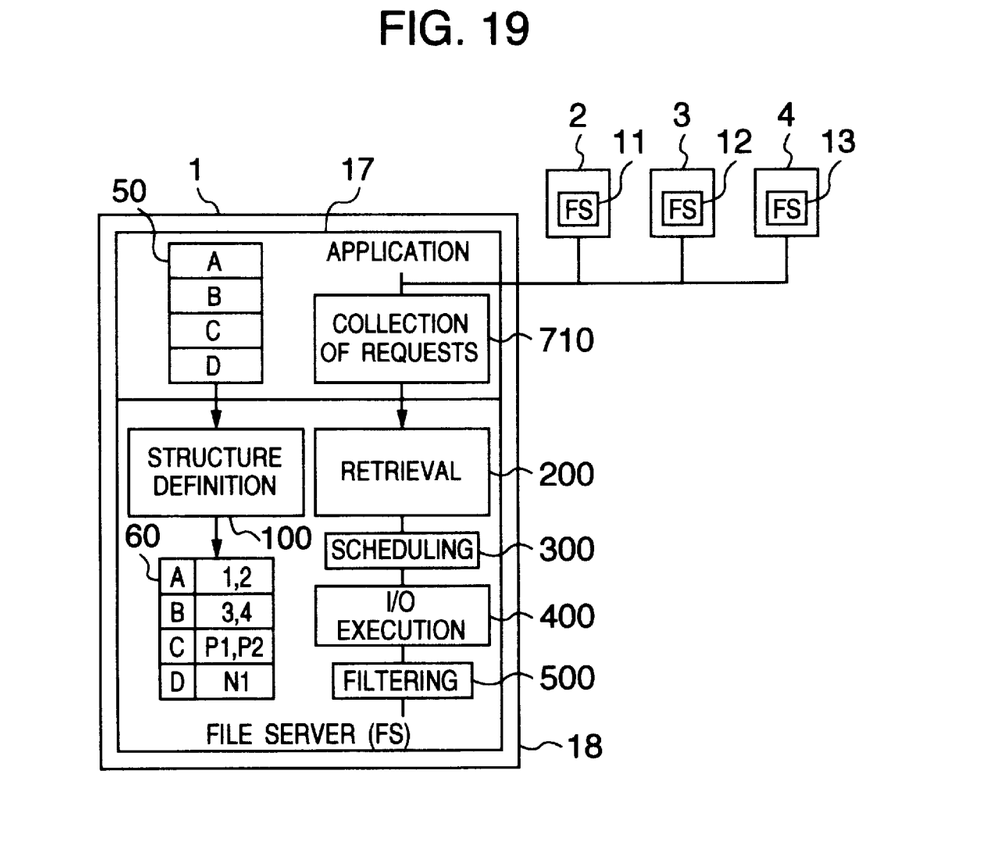
FIG. 19 is a diagram illustrating that one process collects requests from other processes.

In the above example, the data is not filtered so that a filtering Step 500 is not executed. In the following. the filtering Step will be described in which data in a file is stored in a stripe manner in a plurality of disk devices. FIG. 13A shows a file structure script 88 for dividing a file in a stripe manner. FIG. 13B is a diagram showing a logical data array 80 with its data reference being made along a row direction, a data array 81 embedded in a file, a logical data array 85 with its data reference being made along a column direction, and a data array 81' embedded in a file. Data has a two-dimensional array having 100×100 elements. The application program consisting of four processes on the computers 1 to 4 accesses a file having this data structure in parallel. The first "struct" statement defines an array constituted of 100×100 elements. The next "distribute" statement indicates that each row of the array is distributed by four blocks in four disk devices in a stripe pattern. It is assumed that the block length corresponds to 25 elements of type__P data type. Therefore, each row has four blocks. A division state as viewed from a user is indicated at 80. This division assumes a data array which is divided in a row-major way (in a row direction). The data array 81 in the file is in the order of rows starting from the first row of the data array. The data array 82 indicates the physical disk device number which corresponds to the data array 81 in the file. The first row A [1, *] indicates that all blocks are assigned to the disk device 20. The disk device 20 are also assigned A [5, *], A [9, *] and so on. The computer number where application programs process uses the corresponding row of the data array, is indicated at 83. For example, the row A [1, *] is referred to by the application program 17 of the computer 1. With this file structure definition script, the process of the application program of each computer accesses the disk device independently from the other process of the application programs. When the application program accesses the data array in the row direction as described above, the filtering operation does not occur. In order to schedule all the requests by application programs, one of the application programs or processes, for example, the application program 17 or process of the computer 1, is selected as the only one requester issuing all request as shown in FIG. 19. This application program or process makes the list of the requests by the other application programs or processes, and issues an access request to the file server 18. The file server 18 receives the access request consisting of the list of the requests by the other application programs or processes. The application program 17 of the computer 1 issues the access requests on behalf of the other application programs of the computers 2 to 4 by using the application program interface (list interface). The file server 18 performs the retrieval Step 200 and scheduling Step 300 for all access requests in the manner described previously. The I/O execution step 400 is executed on the computer which is designated by the requester. In reading data, the read data is transferred not to the computer 1, but to the computer which originally issues the read request. By passing a list of access requests by the other application program to the file server, it becomes possible to perform a global scheduling of all application programs running in parallel. This scheduling is very effective when data is accessed in the column direction of the array as will be described hereinunder.

Figure 14:
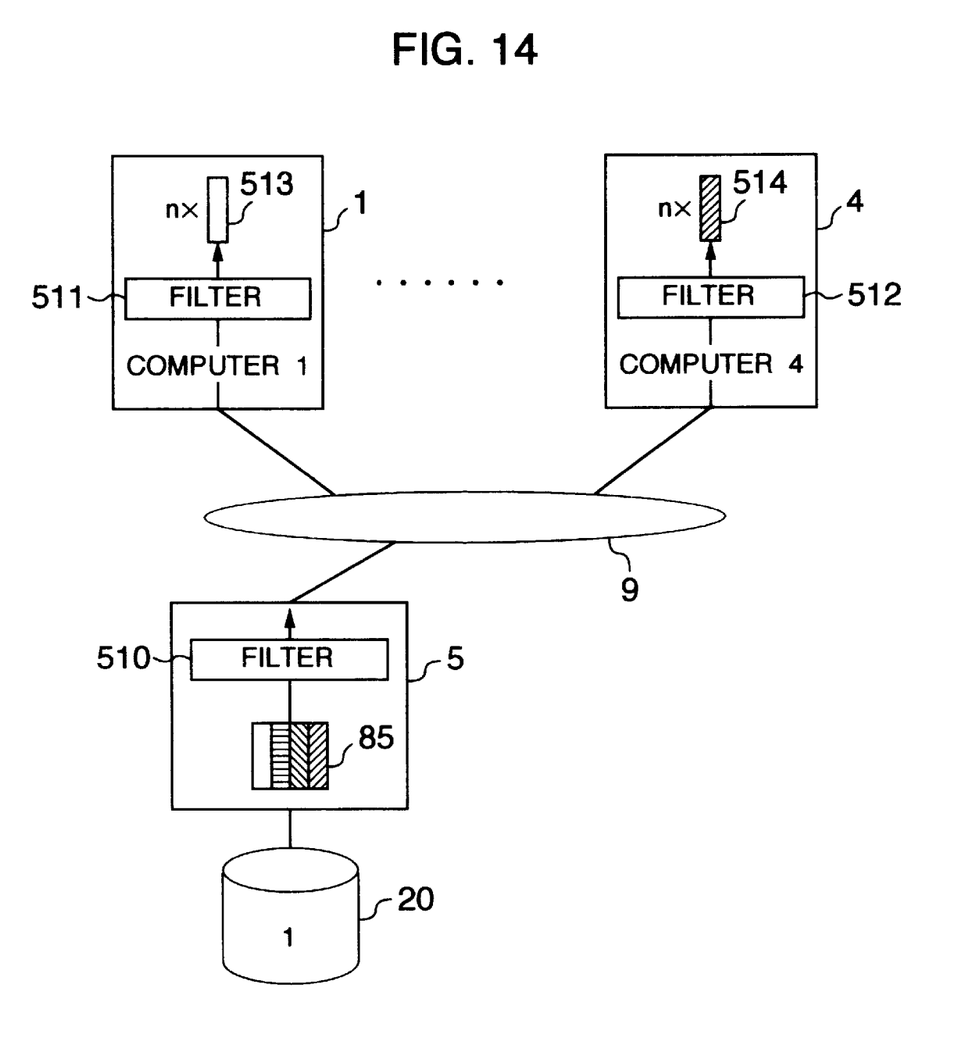
FIG. 14 is a diagram illustrating a filtering process.

Data access by each application program in the column direction of the data array having the structure described above will be described. The array of logical data accessed along a reference direction by the application program is indicated at 85. The row A [*, 1] indicates the first column of the array A. Irrespective of access optimization of the file in the row direction, application programs access each element on different device alternately as indicated at 82' and 84, when the data is accessed in the column direction. For example, the application program 17 running on the computer 1 accesses each element in a white block. If each computer independently accesses the data in such a manner, the I/O performance is degraded considerably. In such a case, i.e., if data to be accessed by the application program contains unnecessary data, it is judged that the data is to be filtered at the filtering Step 500. The application program 17 issues the access request having the access pattern described above to the file server 18, by linking the access request by the other application program. The file server 18 filters the data at the filtering Step 500. This filtering is performed, as shown in FIG. 14, by the computer (filter 510) connected to the disk device or by the access requesting computer (filter 511, 512). FIG. 14 shows a flow of data when each application program reads the data in the disk device 20. Data 85 read from the disk device 20 contains unnecessary data for each application program as shown at 84 in FIG. 13B. It is therefore judged at the scheduling step 305 (FIG. 9) that the unnecessary data is to be filtered at the filtering Step. If the communications control hardware for controlling the network 9 has a function of scatter/gather, the filter 510 prepares for scatter/gather and transfers the necessary data to the corresponding computer. For example, only the data in the white block 84 is collected and transferred to the computer 1. In this case, with the global scheduling function, the file server of the computer 5 judges that blocks 85 other than the white block requested by the computer 1 is necessary so that the data requested by each of the other computers 2 to 4 is also collected and transferred to each computer. If the communications control hardware does not have the function of scatter/gather, the data 85 read from the disk device 20 is broadcast to all the computers 1 to 4. Each computer performs the filtering process by the filter 511, 512 and only the necessary data is passed to the application program. For example, the computer 1 derives only the data in the white block 513 from the received data by the filtering process, whereas the computer 4 derives only the data in a block 514 having densest hatching. With this filtering process, an access unit of the disk device can be made large so that the number of disk access can be reduced and the data can be accessed in the above-described access pattern without lowering the data access performance.

As described above, a user sets a file structure definition by anticipating an optimum access pattern. If a file is accessed by another access pattern (a pattern not optimum), an access request list matching the optimum access pattern is designated without changing the file structure definition. The parallel file access effect of the file system can therefore be maintained with the filtering and global scheduling functions.

The system structure shown in FIG. 1 is only illustrative and various modified systems can be configured. The present invention does not limit the hardware structures, such as the number of computers, a presence of networks, a computer connected to a disk device, a computer installed with an application program, and a computer installed with a file server. The feature of the invention reside in that data is transferred in parallel between a plurality of processes executing application programs and physical devices allocated with regions of files. The system structure satisfying this feature is intended to enter the scope of the invention. The system structure is particularly preferable which can eliminate the bottle necks of a network data transfer speed and a data transfer speed between a disk device and a main memory.

Figure 15:
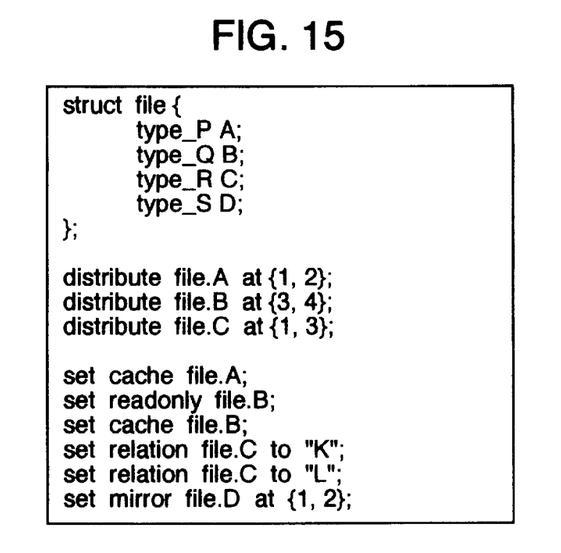
FIG. 15 is a diagram showing an example of a file structure definition script used for designating a cache presence/absence and a reliability as attributes.

Next, the definitions and operations of other attributes 64 will be described. FIG. 15 shows a file structure definition script to be used when a cache presence/absence, a reliability, and an association with other files are designated as the attributes. Since the struct and distribute statements are the same as that described previously, the last six "set" statements will be described. The first "set" statement means that data to be accessed to the region A is cached. The next "set" statement means that an access to the region B is read-only. The third "set" statement means that data to be accessed to the region B is cached. The next two "set" statements mean that the region C is associated with files "K" and "L". The last "set" statement means that data in the region D is mirrored.

Figure 16:
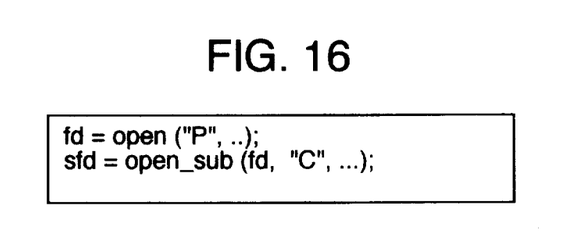
FIG. 16 is a diagram showing an example of an application program which uses at a file I/O execution step the region name designated when the file structure definition is set.

In this example, it is assumed that all regions in a file are accessed. The file server has an interface which allows a region of a file to be opened, by designating the name of the region when the file structure definition is set. This region can be accessed thereafter by using the same primitive interfaces as an ordinary file. FIG. 16 illustrates opening the region C by designating the region name "C" by using a primitive open_sub.

Figure 17:
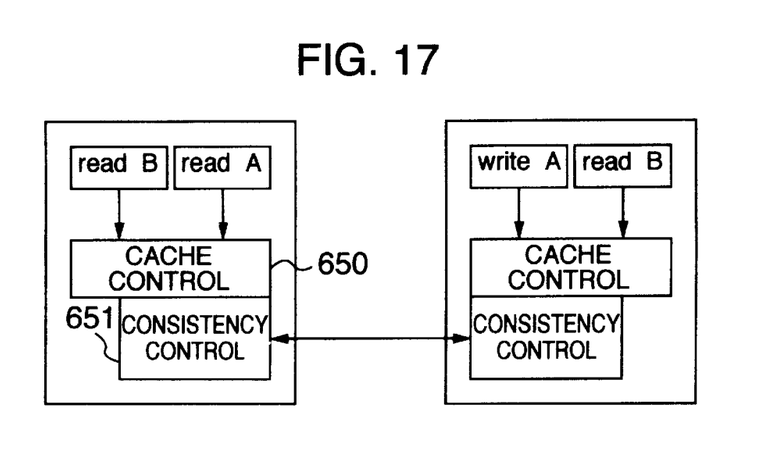
FIG. 17 is a diagram illustrating cache control.

Next, the operation of accessing each region will be described. The region A is designated with a cache attribute. Upon reception of a data read request, if the data is in the cache of the computer, a cache control unit of the computer reads the data in the cache without accessing the disk device. When data is written, the write data is left in the cache, and the write data is written asynchronously. If the region A is accessed by a plurality of application programs, the cache control unit 650 shown in FIG. 17 confirms at a consistency step 651 whether each cache is consistent in different computer and whether it is consistent between caches and file data. In the example shown in FIG. 17, since the read access request to the region A and the write access request to the region A are issued at the same time, the cache control unit 650 determines the order of requests at the consistency step to ensure the consistency between the cache and a file. Although the region B is designated with the cache attribute, the read-only attribute is also designated as the access pattern. Therefore, the cache control unit 650 does not execute the consistency step 651. In this file system, the cache control is automatically changed by the attributes.

It is assumed that the region C is a hyper text. This hyper text has the linked files "K" and "L". In this case, at the same time when the read request to the file C is issued, the read request is also issued to the files "K" and "L" and the data in the files is stored in the buffer. It is possible to thereafter read the data in the files "K" and "L" from the cache so that the files can be accessed at high speed.

The region D is designated with the mirroring to the disk devices 20 and 22. Therefore, upon reception of a write request to the region D, at the I/O execution Step 400 the write data is transferred at the same time to the computers 5 and 6 connected to the disk devices 20 and 22. The computers 5 and 6 perform a write operation in parallel. In the example described above, although the write data of each computer is different, in the case of mirroring the same data is written by the computers 5 and 6. If a failure is detected at one of the disk devices 20 and 22 and when the region D is accessed, the file server executes the I/O operation by using only well-functioned disk device.

What is claimed is:

1. A file input/output control system comprising:
a plurality of first computers each having a plurality of disks and connected to a network; and
at least one second computer connected to the network for accessing the plurality of disks connected to the plurality of first computers,
said second computer comprising:
a retriever for retrieving a plurality of first data access requests issued from a plurality of processes of an application and comparing the plurality of first data access requests with correspondence relation defining information to thereby confirm that the plurality of first data access requests are accesses to a plurality of disks, the correspondence relation defining information being entered by a user in advance and indicating a correspondence relation between the plurality of disks in said first computers and each of a plurality of regions in a file accessed by said second computer; and
a scheduler for creating a plurality of second data access requests to the plurality of disks from a plurality of first data access requests coming from a plurality of second computers confirmed to be accesses to a plurality of disks, in accordance with the correspondence relation defining information between the plurality of disks and each of the plurality of regions in a file stored in the disks of said first computers, and transmitting the plurality of second access requests to the network,
wherein the plurality of second computers access the plurality of disks in accordance with the plurality of second data access requests received via the network.

2. A file input/output control system according to claim 1, wherein each of the plurality of first computers comprises a rearranger for rearranging a plurality of second data access requests for each of the plurality of disks in the order of block numbers in each of the plurality of disks.

3. A file input/output control system according to claim 2, wherein each of the plurality of first computers comprises a merger for merging, upon detection of that the plurality of second data access requests to each of the plurality of disks contain a plurality of data access requests to a continuous disc field, the plurality of disk access requests to one disk access request.

4. A file input/output control system according to claim 3, wherein said merger comprises a disk driver for controlling the plurality of disks and a network driver for holding data obtained by said disk driver by accessing the plurality of disks and transmitting the data to said at least one second computer via the network.

5. A file input/output control system according to claim 4, wherein said network driver comprises a memory for storing the data obtained by said disk driver by accessing the plurality of disks for each of said at least one second computer and transferring the data separately stored in each of said at least one second computer.

6. A file input/output control system according to claim 5, wherein the plurality of first computers are connected via a second networks to said at least one second computer, said network drivers of the plurality of first computers transfer the separately stored data to said at least one second computer via the network and said second networks.

7. A file input/output control system according to claim 6, wherein although two-dimensional array data distributively stored in a file, a plurality of whose regions are stored in the plurality of first computers is defined in a row direction, in response to an access command for referring to the two-dimensional array data in a column direction, said network driver reads data containing unnecessary data from the plurality of disks, transmits the data containing unnecessary data to each of the plurality of second computers, and each of the plurality of second computers filters the data containing unnecessary data to discard the unnecessary data and obtain necessary data for the second computers.

8. An access control method for a file input/output control system having a plurality of first computers each having a plurality of disks and connected to a network and at least one second computer connected to the network for accessing the plurality of disks connected to the plurality of first computers, the access control method of controlling an access command issued from said at least one second computer, comprising the steps of:

in said second computer, retrieving a plurality of first data access requests issued from a plurality of processes of an application and comparing the plurality of first data access requests with correspondence relation defining information to thereby confirm that the plurality of first data access requests are accesses to a plurality of disks, the correspondence relation defining information being entered by a user in advance and indicating a correspondence relation between the plurality of disks and each of a plurality of regions in a file accessed by said second computer;

creating a plurality of second data access requests to the plurality of disks from a plurality of first data access requests confirmed to be accessed to a plurality of disks, in accordance with the correspondence relation defining information between the plurality of disks and each of the plurality of regions in a file stored in the disks of said first computers, and transmitting the plurality of second access requests to the network; and in the plurality of second computers, accessing the plurality of disks in accordance with the plurality of second data access requests received via the network.

9. An access control method according to claim 8, further comprising the step of: in each of the plurality of first computers, rearranging a plurality of second data access requests for each of the plurality of disks in the order of block numbers in each of the plurality of disks.

10. An access control method according to claim 9, further comprising the step of: in each of the plurality of first computers, merging, upon detection of that the plurality of second data access requests to each of the plurality of disks contain a plurality of data access requests to a continuous disk field, the plurality of disk access requests to one disk access request.

11. An access control method according to claim 10, wherein said merging step includes a step of holding data obtained by a disk driver by accessing the plurality of disks and transmitting the data to said at least one second computer via the network.

12. An access control method according to claim 11, further comprising the step of: in each of the plurality of first computers, storing the data obtained by the disk driver by accessing the plurality of disks for each of said at least one second computer and transferring the data separately stored in each of said at least one second computer.

13. An access control method according to claim 12, further comprising the step of: in the plurality of first computers, being connected via second networks to said at least one second computer, said network drivers of the plurality of first computers transfer the separately stored data to said at least one second computer via the network and said second networks.

14. An access control method according to claim 13, further comprising the step of: although two-dimensional array data distributively stored in a file, plurality of whose regions are stored in the plurality of first computers is defined in a row direction, in response to an access command for referring to the two-dimensional array data in a column direction, in the network driver, reading data containing unnecessary data from the plurality of disks, transmitting the data containing unnecessary data to each of the plurality of second computers, and in each of the plurality of second computers, filtering the data containing unnecessary data to discard the unnecessary data and obtain necessary data for the second computers.

15. A storage medium for a file input/output control system having a plurality of first computers each having a plurality of disks and connected to a network and at least one second computer connected to the network for accessing the plurality of disks connected to the plurality of first computers, the storage medium being readable by said at least one second computer and comprising:

a data code section storing, in a computer readable format, a step of retrieving a plurality of first data access requests issued from a plurality of processes of an application and comparing the plurality of first data access requests with correspondence relation defining information to thereby confirm that the plurality of first data access requests are accesses to a plurality of disks, the correspondence relation defining information being entered by a user in advance and indicating a correspondence relation between the plurality of disks and each of a plurality of regions in a file accessed by said second computer; and a data code section storing, in a computer readable format, a step of creating a plurality of second data access requests to the plurality of disks from a plurality of first data access requests confirmed to be accessed to a plurality of disks, in accordance with the correspondence relation defining information between the plurality of disks and each of the plurality of regions in a file stored in the disks of said first computer, and transmitting the plurality of second access requests to the network.

* * * * *